United States Patent [19]

Gallas

[11] Patent Number: 5,036,115
[45] Date of Patent: * Jul. 30, 1991

[54] OPTICAL LENS SYSTEM INCORPORATING MELANIN AS AN ABSORBING PIGMENT FOR PROTECTION AGAINST ELECTROMAGNETIC RADIATION

[75] Inventor: James M. Gallas, San Antonio, Tex.

[73] Assignee: Photoprotective Technologies, Inc., San Antonio, Tex.

[*] Notice: The portion of the term of this patent subsequent to Oct. 6, 2004 has been disclaimed.

[21] Appl. No.: 497,743

[22] Filed: Mar. 19, 1990

Related U.S. Application Data

[63] Continuation of Ser. No. 88,029, Aug. 18, 1987, abandoned, which is a continuation of Ser. No. 837,852, Mar. 6, 1986, abandoned, which is a continuation of Ser. No. 739,756, May 30, 1985, abandoned, which is a continuation of Ser. No. 618,745, Jun. 8, 1984, abandoned.

[51] Int. Cl.$^5$ .............................. C08J 3/00
[52] U.S. Cl. ................... 523/106; 350/1.1; 350/1.2; 350/1.7; 252/582; 252/583; 252/587; 252/588; 428/412; 526/314; 526/259; 526/238.1; 527/201; 527/202; 527/203; 528/200; 528/392; 8/507; 8/509; 8/512; 8/673
[58] Field of Search ............... 523/106; 350/1.1, 1.2, 350/1.7; 252/582, 583, 587, 588; 428/412, 441; 526/314, 259, 238.1; 527/201, 202, 203; 528/206, 392; 424/429; 8/507, 509, 512, 673, 678

[56] References Cited

U.S. PATENT DOCUMENTS

| | | | |
|---|---|---|---|
| 3,322,719 | 5/1967 | Peilstocker | 350/1.1 |
| 3,764,477 | 9/1973 | Lehmann et al. | 527/201 |
| 4,464,525 | 8/1984 | Vance | 528/392 |
| 2,8222,339 | 2/1958 | Hagemeyer, Jr. et al. | 526/238.1 |

FOREIGN PATENT DOCUMENTS

| | | |
|---|---|---|
| 1389087 | 1/1965 | France . |
| 9071149 | 10/1974 | Japan . |
| 1060780 | 3/1967 | United Kingdom . |

OTHER PUBLICATIONS

"Hackh's Chemical Dictionary" Fourth Edition 1983, pp. 413 and 698.
"The Merck Index" Tenth Edition, pp. 266, 827 and 1154.
Organic Chemistry, 4th Ed.; Karrer (1950); pp. 428, 429, 576, 577 and 579.
Today-San Antonio.

*Primary Examiner*—Joseph L. Schofer
*Assistant Examiner*—Alex H. Walker

[57] ABSTRACT

Melanin is used as the absorbing pigment for radiation protective eyeware. Thus, a melanin-plastic copolymer was formed by adding a catalyst (benzoyl peroxide) to the liquid monomer, diethylene glycol bis allyl carbonate (CR-39), which contained dissolved catechol (a melanin precursor); the solution was heated for one day at 50 degrees celsius and an additional two days at 65 degrees celsius and yielded an optically transparent solid plastic with amber color and with an optical absorption spectrum very close to that associated with melanin.

19 Claims, 2 Drawing Sheets

OPTICAL LENS SYSTEM INCORPORATING MELANIN AS AN ABSORBING PIGMENT FOR PROTECTION AGAINST ELECTROMAGNETIC RADIATION

This is a file wrapper continuation application of copending application Ser. No. 07/088,029, filed Aug. 18, 1987, now abandoned, which is a file wrapper continuation application of application Ser. No. 06/837,852, filed Mar. 6, 1986, now abandoned. Application Ser. No. 06/837,852 is a file wrapper continuation application of application Ser. No. 06/739,756, filed May 30, 1985, now abandoned, which is a file wrapper continuation application of application Ser. No. 06/618,745, filed June 8, 1984, now abandoned. This application is related to application Ser. No. 06/739,556, filed May 30, 1985, now U.S. Pat. No. 4,698,374, which is a continuation-in-part application of application Ser. No. 06/618,745. This application is also related to applications Ser. Nos. 07/105,631 and 07/105,632, filed Oct. 5, 1987, now both abandoned, which are continuation-in-part applications of applications Ser. Nos. 07/088,029 and 06/739,556. This application is also related to copending application Ser. No. 07/255,905, filed Oct. 6, 1988 now abandoned, which is a continuation-in-part application of application Ser. No. 07/105,632. This application is also related to copending application Ser. No. 07/454,094, filed Dec. 19, 1989, which is a continuation-in-part application of applications Ser. Nos. 07/088,029, 07/105,631, 07/105,632 and 07/255,905. This application is also related to copending application Ser. No. 07/453,023, filed Dec. 20, 1989, which is a continuation-in-part application of application Ser. No. 07/105,632.

BACKGROUND OF THE INVENTION

1. Field of the Invention

The invention relates to ultraviolet, visible and infrared absorption, and more specifically, to the use of a particular class of ultraviolet, visible and infrared absorbing pigments. It also relates to protective eyeware.

2. Description of the Prior Art

In recent years increasing attention has been given to the importance of protecting the eyes and skin from radiation emitted by artificial and natural light sources. Prolonged exposure of the eyes to reflected solar ultraviolet radiation is believed to result, for example, in the formation of cataracts and general tissue damage.

A variety of commercial optical filters have evolved to meet the threats posed by these radiation environments. Such optical absorption systems include sunglasses, aircraft and automobile windows, welders glasses and others.

In the case of sunglasses, two general types of materials are currently employed as practical absorbing components. Metallic films deposited onto plastic lens substrates are very effective sunscreens providing broadband attenuation of electromagnetic waves from the ultraviolet into the near infrared region of wavelengths. However two disadvantages are associated with this type of sunglass system. Manufacturing steps beyond the formation of the basic plastic lens are required and secondly, waves incident from the rear and reflected directly into the eye pose a new problem and require further manufacturing modifications.

Dyes and pigments comprise the second general class of optical absorbers. These molecular or polymeric elements are either deposited as thin films or are dispersed into the plastic matrix. Disadvantages of this type of system are often the inability of the dye or pigment to absorb radiation sufficiently over all the ultraviolet wavelengths and a tendency to photodegrade. Photodegradation is particularly common to organic dyes and pigments.

The use of melanin, an easily synthesized biopolymer, as a sunglass pigment, offers several advantages over the prior art. This advantages will become evident in the following pages.

Prior art does exist for melanin as a sunscreen; however, this prior art is restricted to the use of melanin as an ultraviolet protecting pigment in a cosmetic cream applied to the skin (see Japanese Patent-kokai-74 71, 149).

SUMMARY OF THE INVENTION

In the following, a novel pigment-optical lens system is presented which provides substantial protection to the eye against solar radiation and, in particular, against the ultraviolet wavelengths.

The essential and distinguishing feature of the present invention is the specific use of melanin as the absorbing pigment in optical lenses or filters, for example, in sunglasses.

It is necessary then to define melanin, as it relates to this invention. Melanin is the brown to black pigment responsible for most of the coloration throughout the animal world. It is found in the hair, skin and eyes and is regarded, by those skilled in the art, as a natural sunscreen against solar radiation. Melanin is easily synthesized from any of the known starting precursor monomers. These melanin precursors can be represented by one of the two general structures:

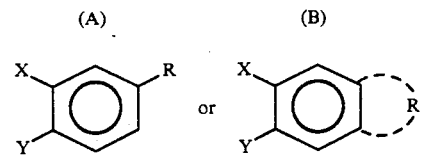

where
X, Y=(OH,OH; H,H; OH,H; or H,OH),
—R=open chain substituent, and

R = cyclic substituent.

It is emphasized that while all known melanin precursors can be represented by these general structures, not all compounds having these general structures can be considered melanin precursors. Thus, additional features which help to characterize melanin will be provided shortly. Some examples of melanin precursors are presented in Table 1:

TABLE 1

| Examples of Known Melanin Precursors | | | | |
|---|---|---|---|---|
| Melanin Precursor | X | Y | —R | R |
| L-Dopa | OH | OH | CO$_2$H<br>\|<br>CH$_2$—CH<br>\|<br>NH$_2$ | — |

TABLE 1-continued
Examples of Known Melanin Precursors

| Melanin Precursor | X | Y | —R | R |
|---|---|---|---|---|
| Catechol | OH | OH | H | — |
| Dopamine | OH | OH | CH₂CH₂NH₂ | — |
| 5,6-Dihydroxy indole | OH | OH | — | (pyrrole ring) |
| Leucodopachrome | OH | OH | — | (pyrrole-CO₂H) |
| Tryptamine | H | H | — | (indole-CH₂CH₂NH₂) |
| Serotonin | OH | H | — | (indole-CH₂CH₂NH₂) |

Using this table, one can easily visualize the complete structure of each melanin precursor. For example, it is evident from the first entry of Table 1. that L-Dopa is an example of the general structure (A), and that its specific structure is:

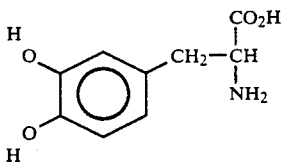

This list is meant to be illustrative but not all inclusive; and, in fact, a general scheme for melanin synthesis, as it relates to this invention, is as follows:

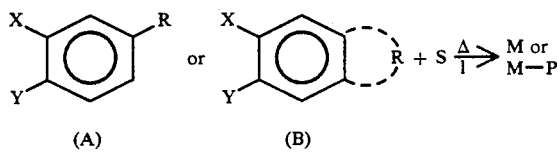

in which:

Structure (A) is a melanin precursor, where R, X and Y are defined as previously, and where said structure (A) is represented, for example by (L-DOPA), Structure (B) is a melanin precursor, where R, X and Y are defined as previously, and where said structure (B) is represented, for example, by (5,6 Dihydroxyindole), M is melanin, M-P is a melanin-plastic copolymer, Δ represents heat, S represents a solvent for which there are three possible cases:

a) inorganic solvents, represented principally by water at an alkaline pH.

b) unreactive organic solvents, for which the term "unreactive" is defined as an organic solvent which does not undergo a free radical copolymerization with the polymerizing melanin. Examples of such solvents are dimethylsulfoxide (DMSO), chloroform and toluene. This list is meant to be illustrative but not all inclusive. When unreactive organic solvents are used, the product of the synthesis is a melanin polymer designated by M, which is suspended, or dissolved, in the solvent S.

c) reactive organic solvents, where the term "reactive" is defined in this case as an organic solvent which is able to undergo a free-radical copolymerization with the polymerizing melanin. Generally these solvents are liquid organic monomers which form plastics, and serve here as both reactants an solvents in the general reaction (1). Examples of such solvents are diethylene glycol bis(allyl carbonate) (CR-39), styrene and methylmethacrylate. Again, this list, which involves monomers that form transparent plastics is meant to be illustrative but not exhaustive. When "reactive" organic solvents are used the product of the synthesis is a melanin-plastic copolymer solid designated by M-P, and l represents a free radical initiator or initiator system. Examples of such initiator systems include benzoyl peroxide, benzoyl peroxide and a base such as triethylamine, oxygen, and oxygen and a base such as sodium hydroxide. Also, there are many other possibilities for the initiator system.

Because of the number of reactive sites in the precursor and its intermediates, this polymerization is heterogeneous and the result is (as is well known to those skilled in the art) an amorphous, highly irregular, three dimensional polymer whose structure is still poorly characterized. Thus, in order to identify and describe melanin it is necessary to describe more than just the starting material and its preparation. To those skilled in the art melanin can be characterized as follows:

1. a polymer whose monomeric precursors are represented by the general structural forms (A) and (B).
2. a polymer whose monomeric precursors polymerize via a free radical mechanism.
3. a polymer with a broad band optical absorption spectrum as shown in FIG. 1.
4. a polymer with a stable free radical which is often studied through ESR spectroscopy
5. an amorphous, three dimensional, heterogeneous polymer, of varying molecular weight.

DESCRIPTION OF THE PREFERRED EMBODIMENT

The following detailed description of the preferred embodiment of the present invention will be better understood by reference to the accompanying drawings wherein.

The use of melanin as a light absorbing pigment for an optical lens system may be accomplished in two general ways.

1. In the first preferred embodiment the melanin pigment is uniformly dispersed within a transparent plastic layer or lens. One way to accomplish this is to synthesize the melanin and the plastic together, that is, by forming a copolymer. This can be done, for example, by dissolving a melanin precursor of the type (A) or (B) and a free radical initiator, I, into a plastic liquid monomer, S which is known to undergo free radical polymerization. Heating and stirring may be required to dissolve all the constituents of the mixture and to promote cleavage of the labile bond of the initiator. This procedure results in a melanin-plastic copolymer, M-P, according to reaction (1).

EXAMPLE 1

Figure 1:
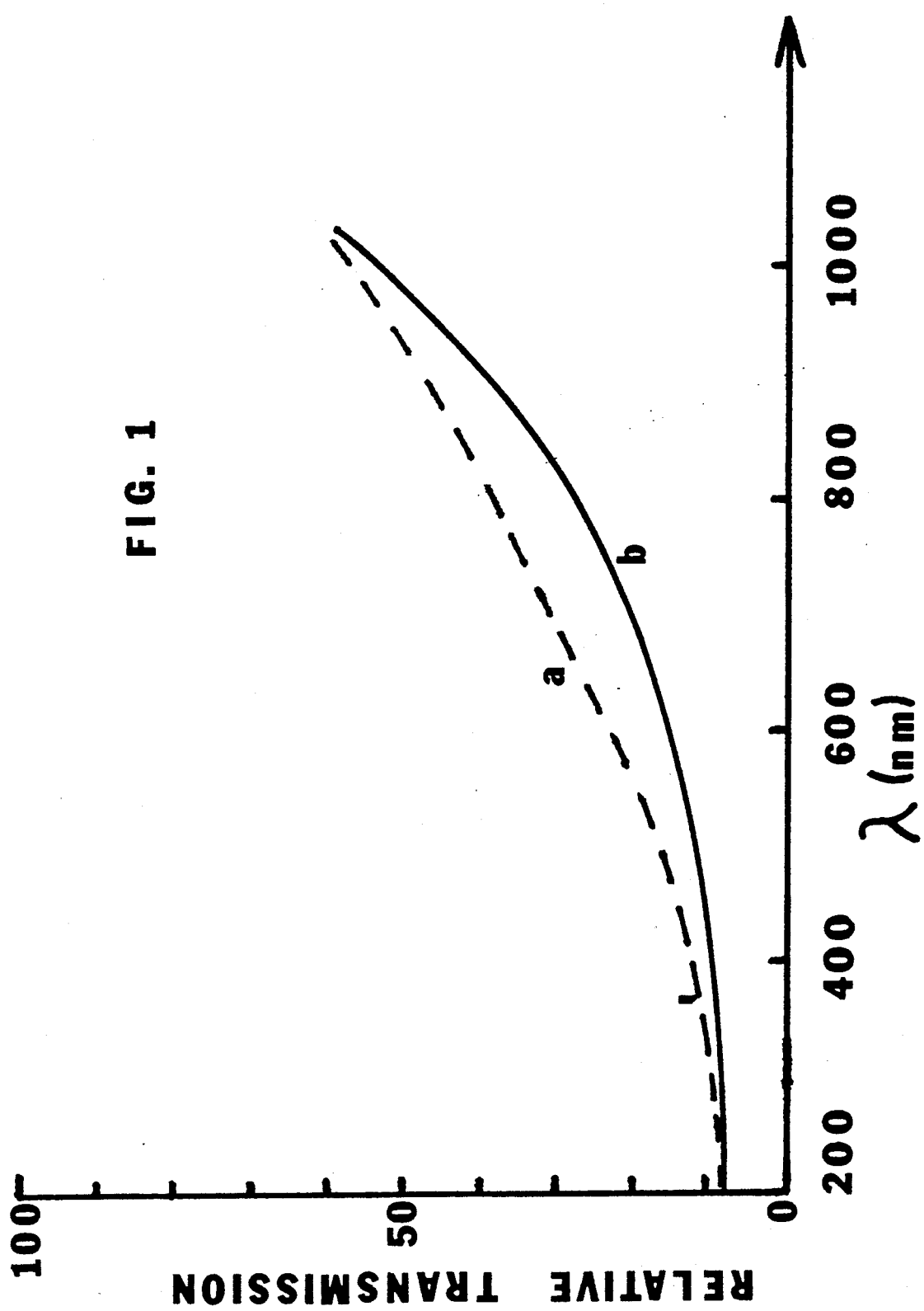
FIG. 1a is an optical transmission spectrum of a plastic lens containing melanin as a copolymer and is described further in Example 1. below.
FIG. 1b is an optical transmission spectrum of melanin, or a melanin coating and is described further in Example 2. below.

A melanin-plastic (M-P) copolymer using the melanin precursor (catechol) may be prepared as follows: Dissolve 400 mg of benzoyl peroxide into 10 ml of diethylene glycol bis allyl carbonate (CR-39) at 50 degrees celsius, stirring continuously until the benzoyl peroxide is fully dissolved. Then add 30 mg of catechol and heat for one day; heat an additional two days at 65 degrees celsius, keeping the sample under a nitrogen atmosphere during the heating. The result is a transparent solid lens with an amber color. The solid is then cured in a vacuum oven at 110-degrees celsius for two hours. The relative transmission for the amber colored solid, of thickness 40 mm, is shown in FIG. 1a. This transmission spectrum illustrates the essential feature of melanin incorporated into an optical lens system for the purpose of radiation protection: that is, a uniform reduction in transmittance across the ultraviolet, visible and near infrared wavelengths, with greatest reduction in transmission occurring at the shorter wavelengths where the radiation is most damaging to biological molecules and tissue. An additional feature of this product is its photostability. Samples prepared as described in Example 1. were placed in direct sunlight and open to the atmosphere continuously for a period of 10 weeks during which the daily average solar intensity peaked midday at approximately 850 watts per square meter. There was no discernible discoloration. This feature is quite uncommon for the case of organic pigments. Finally an important advantage of this pigment lens system is that it requires negligibly more effort than the manufacture of the lens without the pigment.

Figure 2:
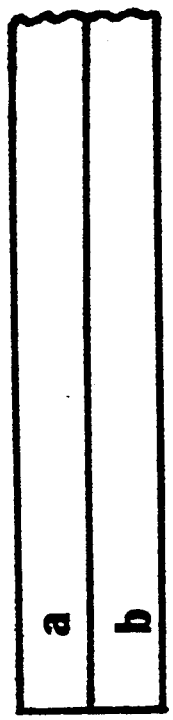
FIG. 2 is a drawing illustrating a transparent plastic or glass lens substrate labeled "b" and a coating of melanin labeled "a" which covers said substrate "b".

2. In the second preferred embodiment, the melanin is applied to the surface of the lens as a coating. This configuration is illustrated in FIG. 2. The layer labeled "a" is meant to be the melanin coating and the layer labeled "b" is meant to be the lens substrate. The configuration may be achieved by first preparing a melanin suspension using a nonreacting solvent S as described earlier, leading to melanin M, as a product, according to reaction (1). Drops of the melanin are then placed onto a clean transparent lens surface and the solvent is then allowed to evaporate, leaving behind a uniform melanin film.

EXAMPLE 2

A melanin coated-glass lens system using melanin precursor 1 (L-DOPA) is prepared as follows: 1 gram of L-DOPA is dissolved into 200 ml of water. 50 ml of potassium phosphate (0.25 M) and sodium phosphate (0.025 M) buffer solution is then added and the pH is then adjusted to 7.5. Air is then bubbled into the stirred solution for three days. The black suspension is then extensively dialyzed and the concentration of the melanin is increased by allowing the water to evaporate by a factor of 0.1 of the original volume. A glass lens substrate is then made hydrophilic by treating it with a hot solution of chromic acid, followed by a rinse with deionized water. Several drops of the concentrated melanin suspension are than allowed to spread over the glass surface. The system is allowed to slowly dry, leaving a solid, transparent melanin film. The optical density of this film is shown in FIG. 1b and is similar to that of FIG. 1a.

What is claimed is:

1. A filter for protecting the eyes and skin from radiation emitted by artificial and natural light sources, comprising:
   a substrate; and
   melanin as absorbing pigment for absorbing ultraviolet, visible and infrared radiation, the substrate and the melanin being transparent.

2. A filter according to claim 1 wherein the filter is a transparent solid lens.

3. A filter according to claim 1 wherein the melanin is formed from the polymerization of a melanin precursor.

4. A filter according to claim 1 wherein the substrate is a layer.

5. A filter according to claim 1 wherein the filter is a sunglass.

6. A filter according to claim 1 wherein the filter is a transparent lens.

7. A filter according to claim 1 wherein the filter is an optical lens.

8. A filter according to claim 1 wherein the filter is a transparent plastic layer and the melanin is uniformly dispersed within the layer.

9. A filter according to claim 8 wherein the plastic layer is solid.

10. A filter according to claim 1 wherein the melanin is on the surface of the substrate as a melanin coating.

11. A filter according to claim 1 wherein the filter is an aircraft window.

12. A filter according to claim 1 wherein the filter is an automobile window.

13. A filter according to claim 1 wherein the filter is a welders glass.

14. A filter according to claim 10 wherein the substrate is a lens and the melanin coating is a transparent melanin film.

15. An optical lens system prepared by a process comprising the step of uniformly dispersing melanin within a transparent plastic layer.

16. An optical lens system according to claim 15 wherein the dispersing step of the process includes the steps of:
   dissolving a melanin precursor monomer which is the melanin precursor of the melanin and a free radical initiator into a plastic liquid monomer which undergoes free radical polymerization to form a mixture; and
   copolymerizing the melanin precursor monomer and the plastic liquid monomer to synthesize the melanin from the melanin precursor monomer and the transparent plastic layer from the plastic liquid monomer.

17. An optical lens system according to claim 16 wherein the process further includes the step of heating the mixture.

18. A lens system prepared by a process comprising the step of applying melanin on the surface of a transparent lens to form a transparent melanin coating on the surface of the transparent lens.

19. A lens system according to claim 18 wherein, prior to the applying step, the process further includes the steps of dissolving a melanin precursor and an initiator in a solvent to form a melanin suspension product and concentrating the melanin suspension product; and the applying step includes the step of allowing the concentrated melanin suspension product to spread over the surface of the transparent lens.

* * * * *